(12) United States Patent
Nilsson et al.

(10) Patent No.: US 11,039,347 B2
(45) Date of Patent: Jun. 15, 2021

(54) TRANSMISSION OF CONTROL INFORMATION USING MORE THAN ONE BEAM PAIR LINK

(71) Applicants: Andreas Nilsson, Gothenburg (SE); Mattias Frenne, Uppsala (SE); Stephen Grant, Pleasanton, CA (US); Claes Tidestav, Bålsta (SE)

(72) Inventors: Andreas Nilsson, Gothenburg (SE); Mattias Frenne, Uppsala (SE); Stephen Grant, Pleasanton, CA (US); Claes Tidestav, Bålsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 526 days.

(21) Appl. No.: 15/752,002

(22) PCT Filed: Nov. 3, 2017

(86) PCT No.: PCT/EP2017/078193
§ 371 (c)(1),
(2) Date: Feb. 12, 2018

(87) PCT Pub. No.: WO2018/083244
PCT Pub. Date: May 11, 2018

(65) Prior Publication Data
US 2020/0221427 A1  Jul. 9, 2020

Related U.S. Application Data

(60) Provisional application No. 62/417,633, filed on Nov. 4, 2016.

(51) Int. Cl.
*H04W 36/00* (2009.01)
*H04W 36/30* (2009.01)
(Continued)

(52) U.S. Cl.
CPC ........ *H04W 36/0055* (2013.01); *H04B 7/024* (2013.01); *H04B 7/0695* (2013.01);
(Continued)

(58) Field of Classification Search
CPC ............. H04W 72/042; H04W 36/305; H04W 36/0027; H04W 48/12; H04W 36/0055;
(Continued)

(56) References Cited

U.S. PATENT DOCUMENTS

| 2014/0092827 A1 | 4/2014 | Jongren et al. |
| 2015/0117382 A1* | 4/2015 | Wang ............ H04L 5/0082 370/329 |
| 2018/0115990 A1* | 4/2018 | Abedini ........... H04W 76/10 |

FOREIGN PATENT DOCUMENTS

| JP | 2015527026 A | 9/2015 |
| WO | 2016044069 A1 | 3/2016 |

OTHER PUBLICATIONS

Second Written Opinion dated Oct. 19, 2018 issued in International Application No. PCT/EP2017/078193. (8 pages).
(Continued)

*Primary Examiner* — Lakeram Jangbahadur
(74) *Attorney, Agent, or Firm* — Rothwell, Figg, Ernst & Manbeck, P.C.

(57) ABSTRACT

One way to increase robustness against beam pair link failure is by transmitting downlink (DL) control signaling (e.g., PDCCH) in more than one beam. That is, one way to mitigate BPLF is for the UE to receive DL control signaling over both a first BPL (e.g., active BPL) and a second BPL (e.g., monitored BPL) but with larger duty cycle for the second BPL compared to the first BPL. For example, the control signaling can be scheduled every slot on the first BPL and scheduled every Nth slot on the second BPL. In this way, in case the first BPL is blocked and the UE cannot decode the control signaling on the first BPL, the UE can receive control signaling transmitted on the second BPL.

12 Claims, 15 Drawing Sheets

(51) Int. Cl.
  *H04B 7/024* (2017.01)
  *H04B 7/06* (2006.01)
  *H04L 5/00* (2006.01)
  *H04W 48/12* (2009.01)
  *H04W 72/04* (2009.01)

(52) U.S. Cl.
  CPC .......... *H04L 5/0007* (2013.01); *H04L 5/0048* (2013.01); *H04W 36/0027* (2013.01); *H04W 36/305* (2018.08); *H04W 48/12* (2013.01); *H04W 72/042* (2013.01)

(58) Field of Classification Search
  CPC ..... H04B 7/024; H04B 7/0695; H04L 5/0007; H04L 5/0048
  See application file for complete search history.

(56) References Cited

OTHER PUBLICATIONS

Intel Corporation, "Discussion on Beamforming for NR PDCCH", 3GPP TSG-RAN WG1 #86-bis; R1-1609519; Lisbon, Portugal (Oct. 10-14, 2016). (7 pages).

3GPP TSG RAN WG1 Meeting #87, R1-1613287, "WF on NR NW Initiated Beam Switching", Intel Corporation, Ericsson, Agenda: 7.1.3.3, Reno, USA, 14-18, Nov. 2016, 3 pages.

International Search Report and Written Opinion dated Apr. 12, 2018 issued in International Patent Application No. PCT/EP2017/078193. (27 pages).

NEC Group, "Reference signals for demodulating R-PDCCH channel", TSG-RAN WG1#60, R1-101322, San Francisco, CA (Feb. 22-26, 2010). (6 pages).

ZTE et al., "High level views on beam management for NR-MIMO", 3GPP TSGRAN WG1 Meeting #86bis, R1-1608664, Lisbon Portugal (Oct. 10-14, 2016). (5 pages).

Ericsson, "Beam Management principles", 3GPP TS WG1 #86bis, R1-1609754, Lisbon, Portugal, Oct. 2016 (7 pages).

Nokia, Alcatel-Lucent Shanghai Bell, "Beam management—DCI monitoring" 3GPP TSG-RAN WG1 #86bis, R1-1610240, Lisbon, Portugal, Oct. 2016 (6 pages).

Intel Corporation, "On QCL to support UE beam management", 3GPP TSG RAN WG1 Meeting #86bis, R1-1609525, Lisbon, Portugal, Oct. 2016 (6 pages).

Intel Corporation, "UE beamforming impact on downlink control channel design", 3GPP TSG RAN WG1 Meeting #66, R1-166567, Gothenburg, Sweden, Aug. 22-26, 2016 (3 pages).

Ericsson, "Discussion on QCL", 3GPP TSG-RAN WG1 #86bis, R1-1609766, Lisbon, Portugal, Oct. 10-14, 2016 (6 pages).

* cited by examiner

Mapping of one CCE belonging to a PDCCH in LTE to the control region which spans the whole system bandwidth.

CCE aggregation illustrating aggregation levels (AL) 8,4,2 and 1.

An exemplifying sketch showing the search space (marked areas) a certain terminal needs to monitor. In total there are $N_{CCE}=15$ CCEs in this example and the common search space is marked with stripes

TRANSMISSION OF CONTROL INFORMATION USING MORE THAN ONE BEAM PAIR LINK

CROSS REFERENCE TO RELATED APPLICATION(S)

This application is a 35 U.S.C. § 371 National Stage of International Patent Application No. PCT/EP2017/078193, filed Nov. 3, 2017, designating the United States and claiming priority to U.S. provisional application No. 62/417,633, filed on Nov. 4, 2016. The above identified applications are incorporated by reference.

TECHNICAL FIELD

Disclosed are embodiments for transmitting control information to a UE using more than one (i.e., a plurality of) beam pair links (BPLs).

BACKGROUND 1.0 Introduction

The Third Generation Partnership Project (3GPP) has begun on work on the development and design of the next generation mobile communications system (a.k.a., as the 5G mobile communication system or simply "5G" for short). 5G will encompass an evolution of today's 4G networks and the addition of a new, globally standardized radio access technology known as "New Radio" (NR).

The large variety of requirements for NR implies that frequency bands at many different carrier frequencies will be needed. For example, low bands will be needed to achieve sufficient coverage and higher bands (e.g. mmW, such as near and above 30 GHz) will be needed to reach the required capacity. At high frequencies the propagation properties are more challenging and high order beamforming at the base station (e.g., eNB or gNB) will be required to reach sufficient link budget. For example, narrow beam transmission and reception schemes may be needed at higher frequencies to compensate the high propagation loss. For a given communication link, a beam can be applied at the transmission point, TRP, (i.e., a transmit (TX) beam) and a beam can be applied at the user equipment (UE) (i.e., a receive (RX) beam)), which collectively is referred to as a "beam pair link" (BPL) or just "link" for short.

NR will have a beam centric design, which means that the traditional cell concept is relaxed and user equipments (UEs) (i.e., fixed or mobile wireless communication devices) will in many cases be connected to and perform "handover" between narrow beams instead of cells. Hence, 3GPP has agreed to study concepts for handling mobility between beams (both within and between transmission points (TRPs)). As used herein, a TRP is a base station or a component of a base station. At higher frequencies, where high-gain beamforming will be needed, each beam will be useful only within a small area (i.e., the beam's coverage area) and the link budget outside the coverage area will deteriorate quickly. Hence, a frequent and fast beam switching method is needed to maintain high performance.

1.1 Beamforming

Beamforming implies transmitting the same signal from multiple antenna elements of an antenna array with an amplitude and/or phase shift applied to the signal for each antenna elements. These amplitude/phase shifts are commonly denoted as the antenna weights and the collection of the antenna weights for each of the antennas is a precoding vector. Such antenna weights and precoding vectors are examples of a transmit spatial filtering configuration.

Different transmit spatial filtering configurations (e.g., different precoding vectors) give rise to a beamforming of the transmitted signal and the weights can be controlled so that the signals are coherently combining in a certain angle direction as seen from the antenna array in which case it is said that a transmit (TX) beam is formed in that direction. Hence, in some contexts, when we refer to a TX beam we are referring to a particular transmit spatial filtering configuration (a.k.a., "beamforming weights" or "beam parameters"), and when we refer to an RX beam we are referring to a particular receive spatial filtering configuration. If the antennas of the array are placed in two dimensions, i.e. in a plane, then the beam can be steered in both azimuth and elevation directions with respect to the plane perpendicular to the antenna array.

1.2 Reference Signals, Antenna Ports and Quasi Co-Location (QCL)

In LTE, reference signals (RSs) used for channel estimation are equivalently denoted as antenna ports. Hence a UE can estimate the channel from one antenna port by using the associated RS. One could then associate a certain data or control transmission with an antenna port, which is equivalent to say that the UE shall use the RS for that antenna port to estimate the channel used to demodulate the associated control or data channel. One could also say that the data or control channel is transmitted using that antenna port.

In LTE, the concept of quasi-co location has been introduced in order to improve the channel estimation performance when demodulating control or data channels. The concept relies on that the UE could estimate long term channel properties from one reference signal in order to tune its channel estimation algorithm. For instance, the average channel delay spread can be estimated using one antenna port and used when demodulating a data channel transmitted using another antenna port. If this is allowed, it is specified that the first and second antenna port are quasi co-located (QCL) w.r.t average channel delay spread.

Hence, as used in LTE specifications, two antenna ports are "quasi co-located" if the large-scale channel properties of the channel over which a symbol on one antenna port is conveyed can be inferred from the channel over which a symbol on the other antenna port is conveyed. The large-scale channel properties preferably include one or more of delay spread, Doppler spread, Doppler shift, average gain, and average delay.

In addition, or alternatively, the large-scale channel properties can include one or more of received power for each port, received timing (i.e., timing of a first significant channel tap), a number of significant channel taps, and frequency shift. By performing channel estimation algorithm tuning based on the RSs corresponding to the quasi co-located antenna ports, a quality of the channel estimation is substantially improved.

In NR, it has been agreed to introduce QCL for spatial properties of the channel on top of those QCL parameters use for LTE. By complementing the existing QCL framework with new QCL parameters that depends on spatial channel properties, we can allow a UE to perform spatial processing across different signal types without violating the rule that a UE is not allowed to use measurements from one reference signal to assist in the reception or processing of another signal unless explicitly specified.

Examples of such spatial processing is analog receiver beamforming, and channel estimation using spatial processing gain to improve the channel estimate.

Assume communication between two nodes in a network, a TX node and an RX node. A TX node transmits a first set of reference signals (RS) from one or multiple transmit antenna ports. An RX node receives the transmitted reference signals using one or multiple receive antenna ports and determines or estimates, based on the received first set of transmitted RS, one or more parameters capturing a spatial property of the channel. The RX node determines an indication that a second set of transmitted RS from one or multiple transmit antenna ports are quasi co-located (QCL) with the first RS, where the QCL is given with respect to the one or more parameters capturing a spatial property of the channel. The TX node transmits the second set of transmit RS from one or multiple transmit antenna ports. The RX node utilizes one or more of the determined parameters capturing a spatial property of the channel that is based on the first set of RS, to assist in the reception of the second set of RS.

In other words, the RX node, typically a UE can use the same RX beamforming weights to receive the second signals and associated RS (such as a control or a data transmission DMRS) as the RX beamforming weights it used when it received a first signal (for example a measurement signal, e.g. CSI-RS) if the second RS is QCL with the first RS with respect to spatial parameters.

A QCL parameter related to a spatial property is related to the UE RX beamforming or UE RX reception parameters. Hence, if the UE use two different spatial QCL parameters can indicate that the UE use two different RX beamforming weights (or equivalently two different ways of combining the signals from the UE RX antennas).

Spatial parameters could be angle of arrival, angular spread or spatial correlation, spatial correlation matrix on the RX side or on the TX side.

It has been agreed for NR that information pertaining to UE-side beamforming/receiving procedure used for data reception can be indicated through QCL to UE (from the base station).

1.3 Control Channel Search Space and Control Signaling

Information transmitted over the radio link to users can be broadly classified as control information (a.k.a., control messages) or user data. Control information is used to facilitate the proper operation of the system as well as the proper operation of each UE within the system. Control information could include commands to control functions such as the transmitted power from a UE, signaling of resource blocks (RBs) within which information is to be received by the UE or transmitted from the UE and so on. Examples of control information include a physical downlink control channel (PDCCH) which for example carries scheduling information and power control messages, a physical HARQ indicator channel (PHICH) that carries ACK/NACK messages sent in response to a previous uplink transmission, and a physical broadcast channel (PBCH) that carries system information. Also the primary and secondary synchronization signals (PSS/SSS) can be seen as control signals with fixed locations and periodicity in time and frequency so that UEs that initially access the network can find them and synchronize.

The PBCH in LTE is not scheduled by a PDCCH transmission but has a fixed location relative to the primary and secondary synchronization signals (PSS/SSS). Therefore, the LTE UE can receive the system information transmitted in BCH before it is able to read the PDCCH. It shall be noted that payload in BCH (which is referred to as the master information block (MIB)) is not fully utilized but contains some unassigned "spare" bits which can be used for future use.

In LTE Rel-10, all control messages to UEs are demodulated using a cell specific RS (CRS) hence they have a cell wide coverage to reach all UEs in the cell without having knowledge about their position. An exception is the PSS and SSS which are stand-alone and do not need reception of CRS before demodulation. The first one to four OFDM symbols, depending on the configuration, in a subframe are reserved to contain such control information, as shown in FIG. 1. Control messages could be categorized into those types of messages that need to be sent only to one UE (UE-specific control) and those that need to be sent to all UEs or some subset of UEs numbering more than one (common control) within the cell being covered by the eNB.

Control messages of PDCCH type are demodulated using CRS and transmitted in multiples of units called control channel elements (CCEs) where each CCE contains 36 resource elements (REs). A PDCCH may have aggregation level (AL) of 1, 2, 4 or 8 CCEs to allow for link adaptation of the control message. Furthermore, each CCE is mapped to 9 resource element groups (REG) consisting of 4 REs each. These REGs are distributed over the whole system bandwidth to provide frequency diversity for a CCE. Hence, the PDCCH, which consists of up to 8 CCEs spans the entire system bandwidth in the first one to four OFDM symbols, depending on the configuration.

Transmission of the physical downlink shared data channel (PDSCH) to LTE UEs, is using the RE in a RB pair that are not used for control messages (i.e., in the data area of shown in FIG. 1) or RS and can either be transmitted using the UE specific RS or the CRS as a demodulation reference, depending on the PDSCH transmission mode. The use of UE-specific RS in LTE allows a multi-antenna LTE base station (eNB) to optimize the transmission using pre-coding of both data and reference signals being transmitted from the multiple antennas so that the received signal energy increase at the UE and consequently, the channel estimation performance is improved and the data rate of the transmission could be increased.

For NR, it is foreseen that UE specific RS is used for control channel transmissions as well.

1.3.1 PDCCH Processing in LTE

After channel coding, scrambling, modulation and interleaving of the control information the modulated symbols are mapped to the resource elements in the control area. As mentioned above, control channel elements (CCE) have been defined, where each CCE maps to 36 resource elements. By choosing the aggregation level, link-adaptation of the PDCCH obtained. In total there are NCCE CCEs available for all the PDCCH to be transmitted in the subframe and the number NCCE varies from subframe to subframe depending on the number of control symbols n and the number of configured PHICH resources.

As NCCE varies from subframe to subframe, the terminal would need to blindly determine the position as well as the number of CCEs used for its PDCCH which can be a computationally intensive decoding task. Therefore, some restrictions in the number of possible blind decodings a terminal needs to go through have been introduced in Rel.8. For instance, the CCEs are numbered and CCE aggregation levels of size K can only start on CCE numbers evenly divisible by K, see FIG. 2.

The set of CCE where a terminal needs to blindly decode and search for a valid PDCCH is called the UEs "search space." This is the set of CCEs on a AL a terminal should monitor for scheduling assignments or other control information, see example in FIG. 3. In each subframe and on each AL, a terminal will attempt to decode all the PDCCHs that can be formed from the CCEs in its search space. If the CRC checks, then the content of the PDCCH is assumed to be valid for the terminal and it further processes the received information. Often will two or more terminals have overlapping search spaces and the network has to select one of them for scheduling of the control channel. When this happens, the non-scheduled terminal is to be blocked. The search spaces for a UE vary pseudo-randomly from subframe to subframe to minimize this blocking probability.

A search space is further divided to a common and a terminal specific part. In the common search space, the PDCCH containing information to all or a group of terminals is transmitted (paging, system information, etc.). If carrier aggregation is used, a terminal will find the common search space present on the primary component carrier (PCC) only. The common search space is restricted to aggregation levels 4 and 8 to give sufficient channel code protection for all terminals in the cell (since it is a broadcast channel, link adaptation cannot be used). The m8 and m4 first PDCCH (first in the meaning of having with lowest CCE number) in an AL of 8 or 4 respectively belongs to the common search space. For efficient use of the CCEs in the system, the remaining search space is terminal specific at each aggregation level.

A CCE consist of 36 QPSK modulated symbols that map to the 36 RE unique for this CCE. Hence, knowing the CCE means that also the RE is known automatically. To maximize the diversity and interference randomization, interleaving is used before a cell specific cyclic shift and mapping to REs, see the processing steps in FIG. 4. Note that in most cases are some CCEs empty due to the PDCCH location restriction to terminal search spaces and aggregation levels. The empty CCEs are included in the interleaving process and mapping to RE as any other PDCCH to maintain the search space structure. Empty CCE are set to zero power and this power can instead be used by non-empty CCEs to further enhance the PDCCH transmission.

Furthermore, to enable the use of 4 antenna TX diversity, a group of 4 adjacent QPSK symbols in a CCE is mapped to 4 adjacent RE, denoted a RE group (REG). Hence, the CCE interleaving is quadruplex (group of 4) based and mapping process has a granularity of 1 REG and one CCE corresponds to 9 REGs (=36 RE).

In LTE, each PDCCH is mapped to RE in all OFDM symbols configured for the control area. This is also seen in FIG. 1 mapping of one CCE belonging to a PDCCH in LTE to the control area which spans the whole system bandwidth.

SUMMARY

One problem with connecting UEs to a narrow beam is that the signal transmitted on the beam could easily be deteriorated for example if an object gets in the way of the beamformed signal and blocks it. Due to high penetration loss and poor diffraction properties at high frequencies a blocking object can lead to lost connection between the TX beam and UE so that the control channel cannot be decoded, which might lead to dropped calls and bad user experience. Such a scenario would be considered a "beam pair link failure" (BPLF).

It is thus a problem how to maintain a communication link with the UE even in operating conditions of narrow beams and presence of blocking objects. In particular it is a problem how to transmit and receive downlink (DL) control signaling (e.g., PDCCH) carrying data scheduling assignments or scheduling grants in such operating conditions.

One way to overcome this problem is to increase robustness against beam pair link failure by transmitting DL control signaling (e.g., PDCCH) in more than one beam (i.e., transmit DL control signaling using more than one transmit spatial filtering configuration). That is, one way to mitigate BPLF is for the UE to receive DL control signaling over both a first BPL (sometimes called the "active link") and a second BPL (sometimes called the monitored link) but with larger duty cycle for the second BPL compared to the first BPL. For example, the control signaling can be scheduled every slot on the first link and scheduled every $N^{th}$ slot on the second link. In this way, in case the first BPL is blocked and the UE cannot decode the control signaling on the first BPL (i.e., the control signaling transmitted using a first transmit spatial configuration), the UE can receive control signaling transmitted on the second link (i.e., the control signaling transmitted using a second transmit spatial configuration).

Preferably, the transmission of the control signaling on more than one BPL is performed in an efficient way. Additionally, the UEs should be configured to monitor the BPLs in a robust and efficient manner. A main advantage of doing this is that the connection, particularly the PDCCH transmission and reception at high frequencies, will be more robust with respect to BPLFs.

Transmitting control signaling in more than one beam can be accomplished, in one embodiment, by having each control channel candidate in the control channel search space be associated with a spatial QCL parameter. In other words, two control channel candidates can be received with different UE RX beams and thus two different TX beams respectively if the two candidates have different QCL parameters with respect to spatial properties. This gives robustness against beam pair link failure as both an active and a monitored BPL can be used to schedule data messages to or from the UE.

Hence, in addition to the TRP transmitting the PDCCH to a UE using an first BPL (e.g., active BPL), and hence using a first TX beam (e.g., using an first precoding vector), for the UE, the TRP transmits the PDCCH to the UE using a second BPL (e.g., monitored BPL), and hence using a second TX beam (e.g., using a second precoding vector), to achieve diversity. In some embodiments, a longer duty cycle is used for the PDCCH transmitted using the second BPL compared to the first BPL. The relation between the spatial QCL parameter and the PDCCH candidate to use when attempting to decode the PDCCH can be different for different PDCCH candidates in the search space in one subframe or in different subframes (or other defined time periods). Alternatively, the association between a PDCCH candidate and the used TX beam and thus the RX beam to use when attempting to decode the PDCCH can be different for different PDCCH candidates in the search space for the UE, either in one subframe or in different subframes (or equivalently in other defined time periods).

Accordingly, in one aspect there is provided a method performed by a TRP for communicating with a UE. The method includes: using a first beam pair link, BPL for communicating with the UE, wherein the first BPL comprises a first transmit spatial filtering configuration and a first receive spatial filtering configuration corresponding to the first transmit spatial filtering configuration, transmitting control information to the UE using the first BPL, and providing to the UE scheduling information indicating a slot in which the TRP may transmit control information to the UE using a second BPL, wherein the second BPL comprises a second transmit spatial filtering configuration.

In some embodiments the method further includes: the TRP detecting that the first BPL has experienced a beam pair link failure, BPLF, and, as a result of detecting that the first BPL has experienced a BPLF, the TRP transmitting control information to the UE in the indicated slot using the second BPL.

In some embodiments, the control information transmitted to the UE in the indicated slot using the second BPL informs the UE that the second BPL is now an active BPL for the UE. In some embodiments, the UE is configured such that the UE will search a control area of the indicated slot for control information transmitted by the TRP using the second BPL.

In some embodiments the step of transmitting control information to the UE using the first BPL comprises transmitting control information to the UE using the first BPL in not more than M of N consecutive slots, wherein N is greater than 1 and M is less than or equal to N, and the indicated slot is one of the N consecutive slots. In some embodiments the scheduling information indicates L slots in which the TRP may transmit control information to the UE using the second BPL, wherein L is greater than or equal to 1 and L is less than M, and each of the L slots is one of the N consecutive slots. In some embodiments M=N−1 and L=1. In some embodiments in one of the N consecutive slots the TRP transmits control information to the UE using the second BPL but does not transmit control information to the UE using the first BPL. In some embodiments M=N and L=1.

In another aspect there is a method performed by one or more TRPs communicating with a UE. The method includes: defining a first search space and a second search space, wherein a first transmit spatial filtering configuration is associated with the first search space and a second transmit spatial filtering configuration is associated with the second search space, for a transmission of a control channel candidate to the UE, selecting the first or second search space, and transmitting the control channel candidate in control channel resources belonging to the selected search space using the transmit spatial filtering configuration associated with the selected search space.

In some embodiments the first transmit spatial filtering configuration is related to a first BPL and the second transmit spatial filtering configuration is related to a second BPL. In some embodiments the selection is based on information that the first BPL has experienced a beam pair link failure (BPLF).

In some embodiments the first search space is a first portion of a control area, and the second search space is a second portion of the control area. In some embodiments the first portion of the control area and the second portion of the control area overlap in time at least partially, or the first portion of the control area does not overlap in time with the second portion of the control area.

In some embodiments the first search space is a first control area, and the second search space is a second control area. In some embodiments the first control area and the second control area overlap in time at least partially, or the first control area does not overlap in time with the second control area.

In another aspect there is provided a TRP that is configured to perform any of the TRP methods described in this disclosure. For example, in some embodiments, the TRP includes a transmitter, a receiver, a memory, and a data processing system comprising one or more processors, wherein the TRP is configured to perform any of the TRP methods described in this disclosure.

In another aspect there is provided a method performed by a UE communicating with one or more TRPs, wherein the TRPs are configured to transmit information to the UE using a first beam pair link, BPL, comprising a first transmit spatial filtering configuration and a first receive spatial filtering configuration corresponding to the first transmit spatial filtering configuration. The method includes the UE using the first receive spatial filtering configuration corresponding to the first transmit spatial filtering configuration to obtain control information transmitted to the UE using the first BPL, and the UE obtaining scheduling information indicating a slot in which one of the TRPs may transmit control information to the UE using a second BPL comprising a second transmit spatial filtering configuration and a second receive spatial filtering configuration corresponding to the second transmit spatial filtering configuration.

In some embodiments a TRP transmits in the slot the control information to the UE using the second BPL in the event that the TRP detects that the first BPL has experienced a beam pair link failure.

In some embodiments, as a result of receiving the scheduling information, the UE uses the second receive spatial filtering configuration corresponding to the second transmit spatial filtering configuration to search the indicated slot for control information transmitted to the UE, and, as a result of the search, the UE obtains control information transmitted to the UE, and the obtained control information informs the UE that he second BPL is now an active BPL for the UE.

In some embodiments the indicated slot is a slot in which a TRP does not transmit control information to the UE using the first BPL.

In another aspect there is another method performed by the UE. The method includes: the UE using a first parameter corresponding to a first BPL to search a first search space for control information transmitted by a TRP to the UE using the first BPL, and the UE using a second parameter corresponding to a second BPL to search a second search space for control information transmitted by a TRP to the UE using the second BPL. The first BPL comprises a first transmit spatial filtering configuration and a first receive spatial filtering configuration corresponding to the first transmit spatial filtering configuration. The second BPL comprises a second transmit spatial filtering configuration and a second receive spatial filtering configuration corresponding to the second transmit spatial filtering configuration. In some embodiments, the UE uses the second parameter corresponding to the second BPL to search the second search space for control information when the UE is unable to find the control information transmitted using the first BPL.

In another aspect there is another method performed by the UE. The method includes: the UE using a first QCL parameter for receiving a control channel candidate transmitted in a first search space, and the UE using a second QCL parameter for receiving a control channel candidate transmitted in a second search space. In some embodiments, the first search space is a first portion of a control area, and the second search space is a second portion of the control area. In some embodiments, the first portion of the control area and the second portion of the control area overlap in time at least partially, or the first portion of the control area does not overlap in time with the second portion of the control area.

In some embodiments, the first search space is a first control area, and the second search space is a second control area. In some embodiments, the first control area and the second control area overlap in time at least partially, or the first control area does not overlap in time with the second control area.

In some embodiments, the method also includes the UE receiving configuration information using a higher layer message, wherein the configuration information configures first and second search spaces.

In another aspect there is provided a UE that is configured to perform any of the UE methods described in this disclosure. For example, in some embodiments, the UE includes a transmitter, a receiver, a memory, and a data processing system comprising one or more processors, wherein the UE is configured to perform any of the UE methods described in this disclosure.

In another aspect there is provided a method performed by a system comprising a first TRP for communicating with a UE and a second TRP for communicating with the UE. The method includes: the first TRP using a first beam pair link (BPL) for communicating with the UE, the second TRP using a second BPL for communicating with the UE, the first TRP transmitting control information to the UE using the first BPL, and providing to the UE scheduling information indicating a slot in which the second TRP may transmit control information to the UE using the second BPL.

In some embodiments the method also includes: detecting that the first BPL has experienced a beam pair link failure (BPLF), as a result of detecting that the first BPL has experienced a BPLF, the second TRP transmitting control information to the UE in the indicated slot using the second BPL. In some embodiments the control information transmitted to the UE in the indicated slot using the second BPL informs the UE that the second BPL is now an active BPL for the UE. In some embodiments the UE is configured such that the UE will search a control area of the indicated slot for control information transmitted by the second TRP using the second BPL.

In some embodiments the step of transmitting control information to the UE using the first BPL comprises transmitting control information to the UE using the first BPL in not more than M of N consecutive slots, wherein N is greater than 1 and M is less than or equal to N, and the indicated slot is one of the N consecutive slots. In some embodiments the scheduling information indicates L slots in which the second TRP may transmit control information to the UE using the second BPL, wherein L is greater than or equal to 1 and L is less than M, and each of the L slots is one of the N consecutive slots. In some embodiments M=N−1 and L=1. In some embodiments, in one of the N consecutive slots the second TRP transmits control information to the UE using the second BPL but the first TRP does not transmit control information to the UE using the first BPL. In some embodiments M=N and L=1.

In another aspect there is provided another method performed by one or more TRPs. The method includes: a TRP using a first transmit spatial filtering configuration to transmit a PDCCH control message in a first search space, and a TRP using a second transmit spatial filtering configuration to transmit a PDCCH control message in a second search space. In some embodiments, the first search space is a first portion of a control area, and the second search space is a second portion of the control area, or the first search space is a first control area, and the second search space is a second control area.

In another aspect there is provided another method performed by one or more TRPs. The method includes: a TRP using a first transmit spatial filtering configuration to transmit a PDCCH control message in a first set of one or more symbols of a slot, a TRP using a second transmit spatial filtering configuration to transmit a PDCCH control message in a second set of one or more symbols of the slot.

In another aspect there is provided another method performed by a UE. The method includes: the UE using a first receive spatial filtering configuration to search for a PDCCH control message in a first search space, and the UE using a second receive spatial filtering configuration to search for a PDCCH control message in a second search space. In some embodiments, the first search space is a first portion of a control area, and the second search space is a second portion of the control area, or the first search space is a first control area, and the second search space is a second control area.

In another aspect there is provided another method performed by a UE. The method includes: the UE using a first receive, receive spatial filtering configuration to search for a PDCCH control message in a first set of one or more symbols, and the UE using a second receive spatial filtering configuration to search for a PDCCH control message in a second set of one or more symbols.

In another aspect there is a method that includes performing at least one of: configuring a UE to monitor a PDCCH on M beam pair links simultaneously, wherein M is greater than 1, and configuring the UE to monitor the PDCCH on different beam pair links in different PDCCH OFDM symbols.

BRIEF DESCRIPTION OF THE DRAWINGS

The accompanying drawings, which are incorporated herein and form part of the specification, illustrate various embodiments.

DETAILED DESCRIPTION

One way to mitigate the problem of BPLF is to use a second (e.g., monitored (a.k.a., backup)) transmit (TX) beam (e.g., use, among other things, a second precoding vector) that can be used in case the first (e.g., active) BPL experiences a BPLF (e.g., is blocked). Hence, at least two TX beams (e.g., at least two precoding vectors) are used to communicate with a UE. In the case the UE preforms receive (RX) beamforming using analog beamformers, the UE can only tune its RX beam to one TX beam at a time. Likewise, if the TRP uses analog beamforming, only one beam can be transmitted at a time. Hence, there is a need to align the TX beam (i.e., transmit spatial filtering configuration) with the correct RX beam (i.e., receive spatial filtering configuration) at a given time. For each TX beam there is an "optimal" UE RX beam corresponding to the TX beam (e.g., optimal receive spatial filtering configuration, which may include phase and/or amplitude adjustment parameters for each signal received via multiple receive antennas, which parameters are applied to the signals before combining or summation of the signals).

A first transmit spatial filtering configuration (i.e., TX beam) and its corresponding receive spatial filtering configuration (i.e., RX beam) at the UE can be seen as a first beam pair link (BPL), which is used for the control and possibly also the data transmission. In addition, a secondary TX beam (i.e., one or more secondary TX beams) and corresponding RX beams can be used as secondary (e.g., monitored) BPLs.

Beam management refers to maintaining a beam pair link by, for example, triggering the UE to make measurements and report measurement results. The purpose of the second BPL (hereafter "monitored BPL") is to 1) discover new BPLs that are better than the first BPL (hereafter "active BPL"), and 2) have a monitored BPL in case the active BPL experiences a BPLF. Since the majority of the communication takes place using the active BPL (i.e., the active TX beam and the active RX beam), the secondary BPLs can be seen as being "backup" or "monitored" BPLs.

Figure 1:
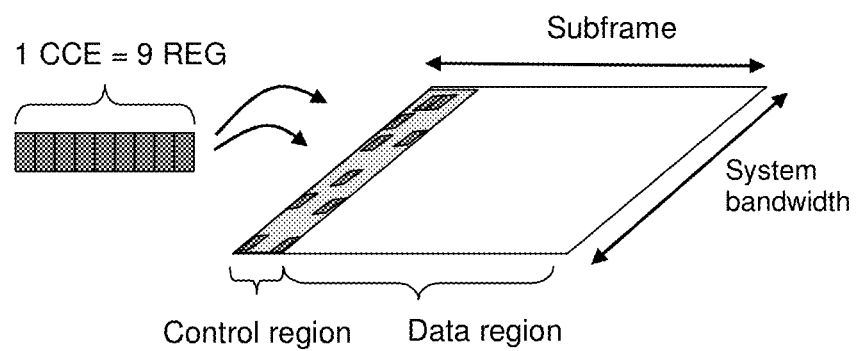
FIG. 1 illustrates an exemplary subframe.
Figure 2:
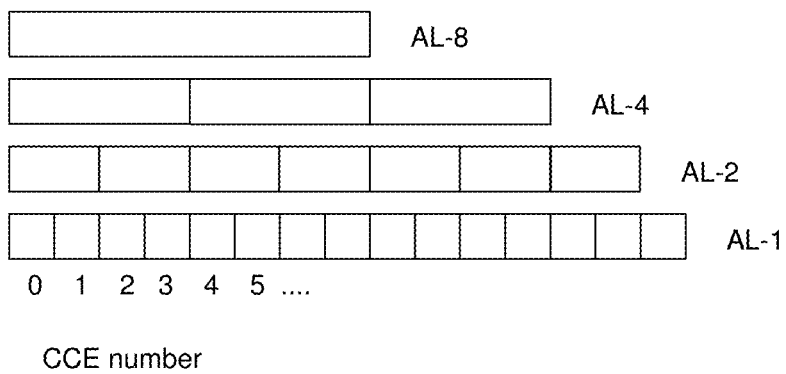
FIG. 2 illustrates CCE aggregation.
Figure 3:
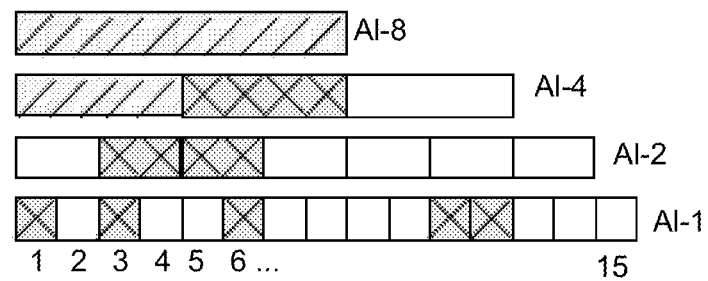
FIG. 3 illustrates an example search space.
Figure 4:
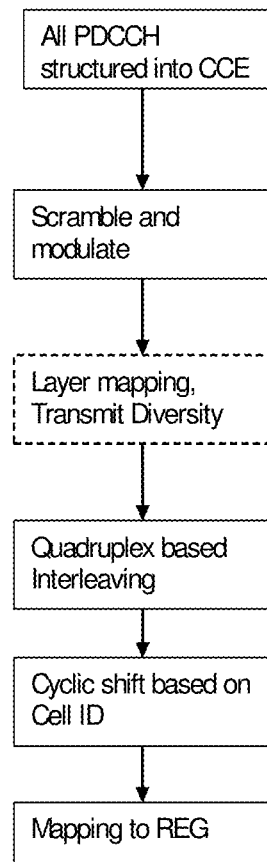
FIG. 4 is a flow chart illustrating processing steps.
Figure 5A:
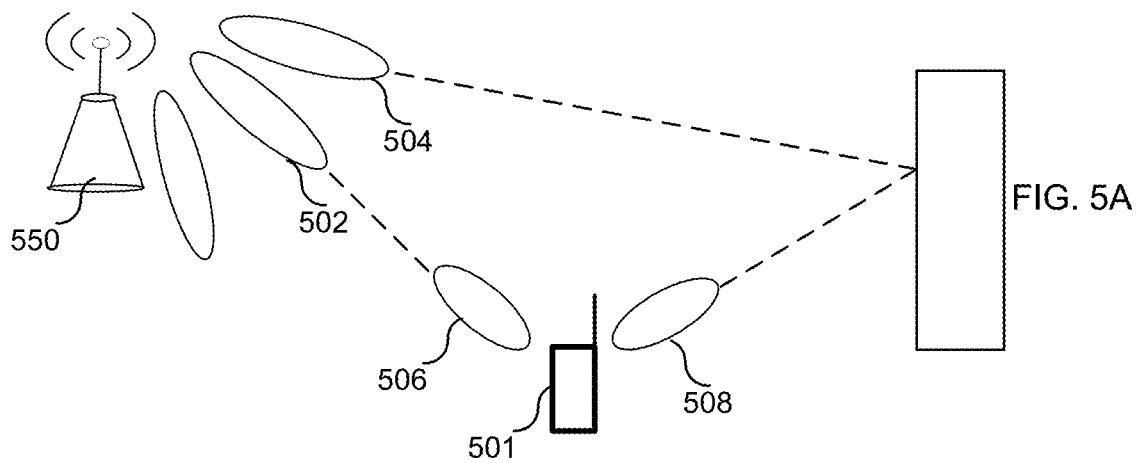
FIGS. 5A, 5B and 5C illustrate the use of active and monitored BPLs for communications between a TRP and a UE.
Figure 5B:
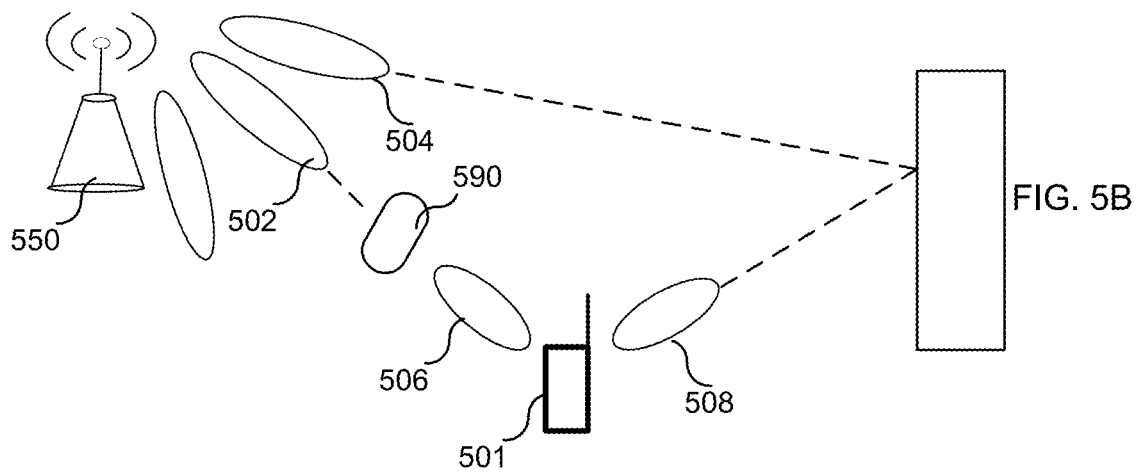
Figure 5C:
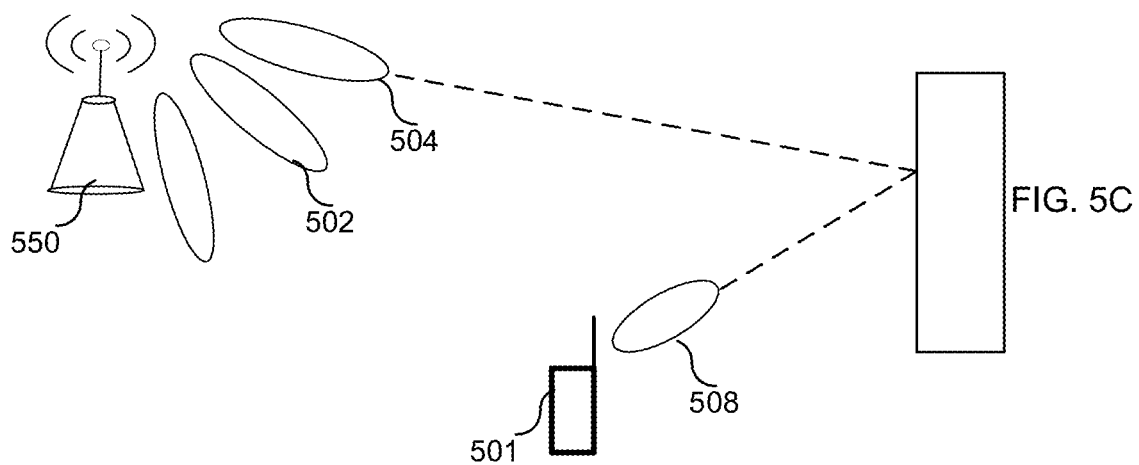
Figure 15:
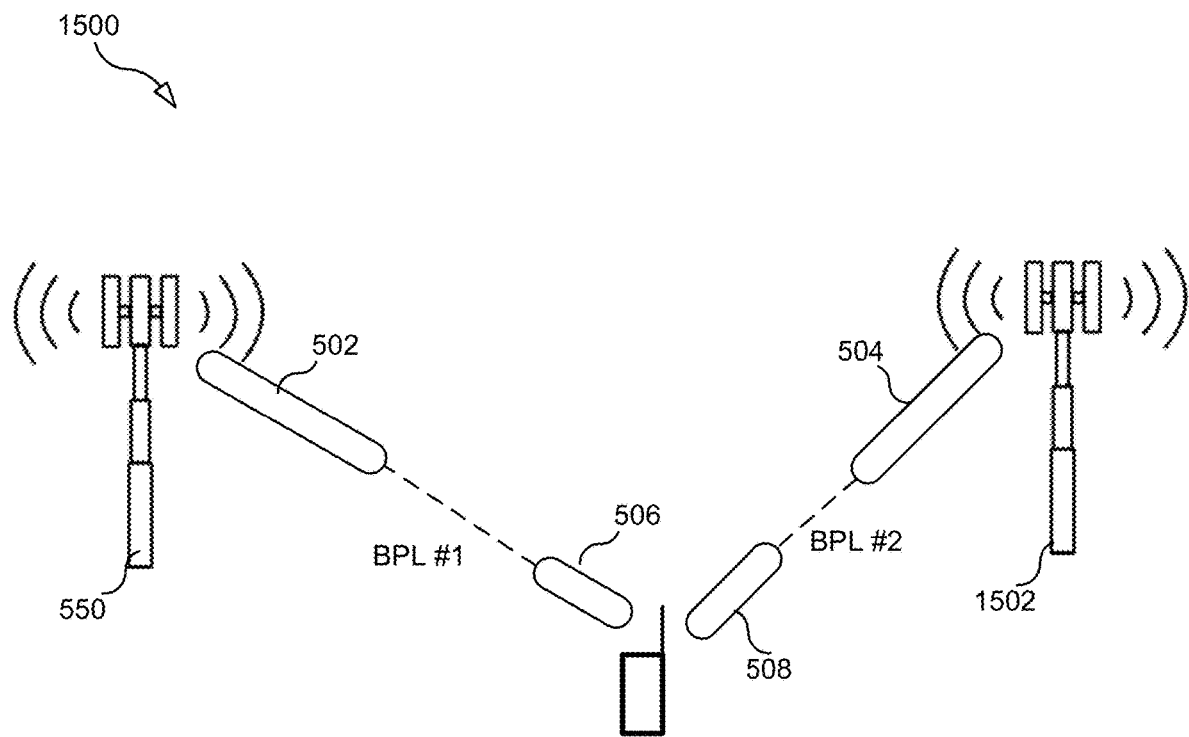
FIG. 15 illustrate the use of first and second BPLs for communications between two TRPs and a UE.

An example of this is illustrated in FIGS. 5A, 5B and 5C. In FIG. 5A, there is shown a TRP 550 (e.g., a base station) using one active BPL for UE 501 to transmit to the UE control information (e.g., PDCCH) and user data and further using one monitored (backup) BPL for the UE. While FIGS. 5A, 5B, and 5C illustrate a single TRP communicating with the UE, in other embodiments two or more TRPs may be communicating with the TRP, wherein one of the TRPs uses the active BPL to communicate with the UE and another of the TRPs uses the monitored BPL to communicate with the UE (see e.g., FIG. 15).

The active BPL comprises active transmit (TX) beam 502 and the corresponding active RX beam 506, and the monitored BPL comprises the monitored TX beam 504 and the corresponding monitored RX beam 508. The UE is decoding PDCCH candidates in the search space using the RX beam 506 corresponding to the active TX beam 502 (i.e., the base station is transmitting its PDCCH to the UE using the active TX beam). PDCCH is used throughout to indicate the control channel carries scheduling information. Another term may be NR-PDCCH.

In FIG. 5B there is shown an object 590 that is blocking the active BPL, thereby causing the UE to detect a BPLF with respect to the active BPL (i.e., the active TX beam/active RX beam pair). A problem arises in that the TRP cannot switch the PDCCH transmission to the monitored BPL since the UE is still monitoring the UE RX beam 506 corresponding to the active TX beam 502 as the UE is unaware of the blocking. Moreover, the TRP may also be unaware of the blocking situation.

To restore the connection between the TRP and the UE, the TRP can use the monitored BPL as the active BPL for the UE, as illustrated in FIG. 5C. However, to efficiently perform this beam switching, the TRP must first signal to the UE that it will start using the monitored BPL as the active BPL, otherwise the UE will not know which UE RX beam to use during reception (i.e., RX beam 506 or RX beam 508).

This is problematic because the active BPL, which is used for control signaling, is blocked and has poor or non-existing channel quality. If the blocking happens slowly, there may be time to perform this signaling before the signal degrades too much.

There is a risk that the blocking will happen too quickly such that the TRP does not have time to signal a "beam switch" (a.k.a., "BPL switch") to the UE, and in this case the UE will continue to search, without success, for PDCCH using the RX beam 506 corresponding to the TX beam 502 that is now blocked. Embodiments disclosed here overcome this problem.

In one embodiment, the TRP transmits the PDCCH (or other control information) to the UE using both an active BPL and a monitored BPL, thereby improving diversity and thus improving robustness. In some embodiments, the fraction of time or resources for which the monitored BPL is used for PDCCH transmission and reception is controlled, for instance by higher layer signaling, such as RRC signaling.

Typically, the PDCCH will be transmitted more rarely using the monitored BPL compared with the active BPL. For example, in one embodiment the PDCCH is time multiplexed between the active and the monitored BPLs such that in every Nth subframe (e.g., N is configured by the network) the TRP transmits the PDCCH to the UE using the monitored BPL for the UE instead of the active BPL for the UE. In another embodiment, the PDCCH is always transmitted to the UE using the active BPL for the UE but every Nth subframe (e.g., N configured by the network) the PDCCH is also transmitted to the UE using the monitored BPL for the UE.

On the UE side, the corresponding embodiments holds in case the UE uses UE RX beamforming: 1) the PDCCH search space is time multiplexed between the active and the monitored BPLs such that in every Nth subframe the UE receives the PDCCH search space using the monitored BPL instead of the active BPL; and 2) the PDCCH search space is always monitored using the active BPL but every Nth subframe the PDCCH is also monitored using the monitored BPL.

In the first embodiment the PDCCH transmission for the given UE is time multiplexed between the active BPL and the monitored BPL but preferable with a longer duty cycle for the monitored BPL. Hence, the UE shall use the RX beam corresponding to the monitored BPL (i.e., the RX beam of the monitored beam pair link) whenever the network is using the monitored BPL for PDCCH transmission. So the network and UE are synchronized in when to use the first or second (i.e. active and monitored) beam pair link for PDCCH transmission and reception.

For example, the PDCCH is transmitted nine times in a row using the active BPL and the tenth time using the monitored BPL.

In one embodiment this can be achieved by associating a PDCCH candidate with a certain spatial correlation or angle of arrival parameter in the quasi-colocation framework in a given subframe. Hence, when receiving a PDCCH candidate, the UE also knows the QCL parameter for that PDCCH, so it knows which RX beam to use for its reception. The PDCCH is thus spatially QCL with a beam management process, with a given identity, or a link identifier (such as active/monitored or [beam pair] link 1, link 2 etc) or an RS or another signal. Hence, the PDCCH may alternatively be spatially QCL with the identity or resource of a CSI measurement reference signal that previously has been transmitted. Alternatively, the PDCCH may be spatially QCL with a measurement signal used for mobility or synchronization, such as mobility RS, beam RS, primary or secondary synchronization signals (PSS,SSS).

The TRP signals to the UE which previous signal, RS or process is QCL with respect to spatial parameter with the demodulation RS used for PDCCH reception. This signaling may be explicit, implicit (including given by a rule in the standard specification).

Hence, PDCCH candidates are QCL with at least two different spatial QCL settings and the UE may adjust its receive beam depending on the QCL setting. The active BPL has one spatial QCL setting (a first RX beam) and the monitored BPL a different spatial QCL setting (a second RX beam). In the first embodiment the PDCCH transmission for the given UE from the TRP is time multiplexed between the active BPL and the monitored BPL, and the UE use the spatial QCL settings accordingly, but with a possible longer duty cycle for the monitored BPL.

The relation between spatial QCL parameter and the PDCCH candidate can be per subframe. Hence, the spatial QCL parameter to use for receiving PDCCH is at least dependent on a time index, such as subframe.

More generally; a sub-set (or all) of the PDCCH search space candidates in a given subframe are located in the monitored BPL with a longer duty cycle. In this case, the relation between the spatial QCL parameter and the PDCCH candidate can be different for different candidates. So the TRP may transmit the PDCCH candidate in different TX beams and the UE use different UE RX beams to receive and attempt to decode the candidate. Which RX beam to use is given by the spatial QCL parameter associated with the PDCCH candidate.

Figure 6:
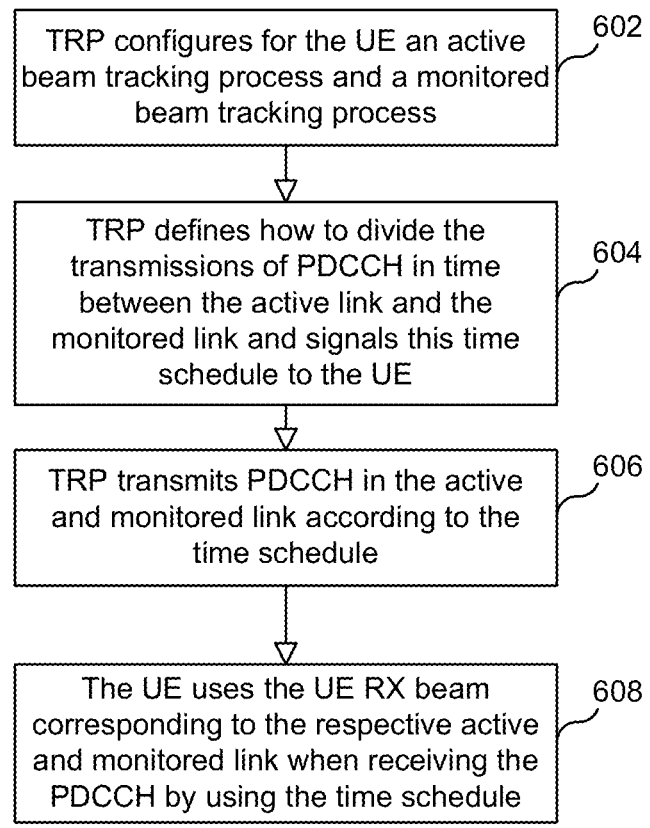
FIG. 6 is a flow chart illustrating a process according to one embodiment.

The UE will know the time schedule and hence listen with the correct UE RX beam at the right times. FIG. 6 illustrates a method according to an embodiment. In step 602 the TRP defines the first and second (e.g., active and monitored) BPL (beam tracking processes) and signals this to the UE. Each beam tracking process may be associated with a spatial QCL parameter. Alternatively, each tracking process is associated with an index of a previous CSI-RS measurement or a mobility RX (MRS) so the UE knows that the network will use the same beam for the PDCCH as is previously used for a CSI-RS or MRS transmission. The TRP also defines a time schedule for how to time multiplex the PDCCH transmissions between the first and second (e.g., active and monitored) BPLs and signals this info to the UE (step 604). In step 606, the TRP transmits the PDCCH using the first and second (e.g., active and monitored) BPLs according to the time schedule. And in step 608, the UE receives the PDCCH using the UE RX beam that corresponds to the first and second BPLs. In case the PDCCH from second BPL is detected but not the PDCCH from the first BPL, the TRP should switch such that the second BPL becomes the new active BPL. This could for example be included in the PDCCH signal transmitted using the monitored BPL.

In the second embodiment the PDCCH for a given UE is transmitted normally (for example every subframe) using the first BPL and in addition the PDCCH is transmitted every Nth subframe using the second BPL (the PDCCH from the two links may be transmitted on different OFDM symbols when scheduled in the same subframe or slot so that it is possible for the UE to switch to the UE RX beam corresponding to the right link).

Hence, if for example the PDCCH for the active BPL is scheduled on the first OFDM symbol and the PDCCH for the monitored BPL is scheduled on the second OFDM symbol, the UE will use the first RX beam when attempting to decode PDCCH candidates in the first OFDM symbol and the second RX beam when attempting to decode PDCCH candidates in the second OFDM symbol. Stated differently, the UE will use the first spatial QCL parameter when attempting to decode PDCCH candidates in the first OFDM symbol and the second spatial QCL parameter when attempting to decode PDCCH candidates in the second OFDM symbol. The UE will always try to decode the PDCCH candidates from the active BPL, and in one alternative embodiment, if the decoding is successful the UE will not try to decode the PDCCH candidates from the monitored BPL.

If the active BPL gets blocked such that the corresponding PDCCH cannot be decoded by the UE, the UE can wait until the PDCCH is transmitted using the monitored BPL and hopefully decode the PDCCH in this way. In one embodiment the PDCCH from the monitored BPL contains a command that switch the active BPL to the monitored BPL directly. In this case, the UE shall start to monitor the search space candidates associated with the monitored BPL directly, i.e. using the UE RX beam corresponding to the monitored BPL.

As described above, the PDCCH from the active and monitored BPLs that are in the same subframe must be scheduled on different OFDM symbols in the same slot or subframe. The OFDM symbols containing the two PDCCHs can either be consecutive or have a time duration between them. One benefit with having a time duration between the two PDCCH is that the UE then has time to evaluate if the PDCCH from the active BPL is properly decoded before the PDCCH from the monitored BPL is received. Hence, in case the PDCCH corresponding to the active BPL is properly decoded the UE does not have to change UE RX beam corresponding to the monitored BPL (i.e., the RX beam of the monitored beam pair link) for the OFDM symbol containing the PDCCH for the monitored BPL. In this way it is possible to also schedule data for the active BPL in this OFDM symbol in some cases (depending on antenna implementation at the TRP, antenna implementation at the UE, scenario etc).

The PDCCH transmitted using the monitored BPL (e.g. the second spatial QCL parameter) can be transmitted every subframe or with a longer duty cycle compared to the PDCCH using the active BPL (first spatial QCL parameter). In some embodiments, for the subframes where no PDCCH is transmitted using the monitored BPL, only the first OFDM symbol is used for PDCCH (but in other embodiments more than one OFDM symbol may be used for PDCCH) and data can be scheduled for that second OFDM symbol instead (because the start of the data symbols can be indicated in the DCI message).

In one embodiment the duty cycle for the PDCCH transmissions in the monitored BPL is configurable using higher layer signaling from TRP to UE, such as RRC signaling, depending on environment (for example how common blocking is) and can be either UE-specific or broadcasted. It should also be possible to turn it off completely.

Figure 7:
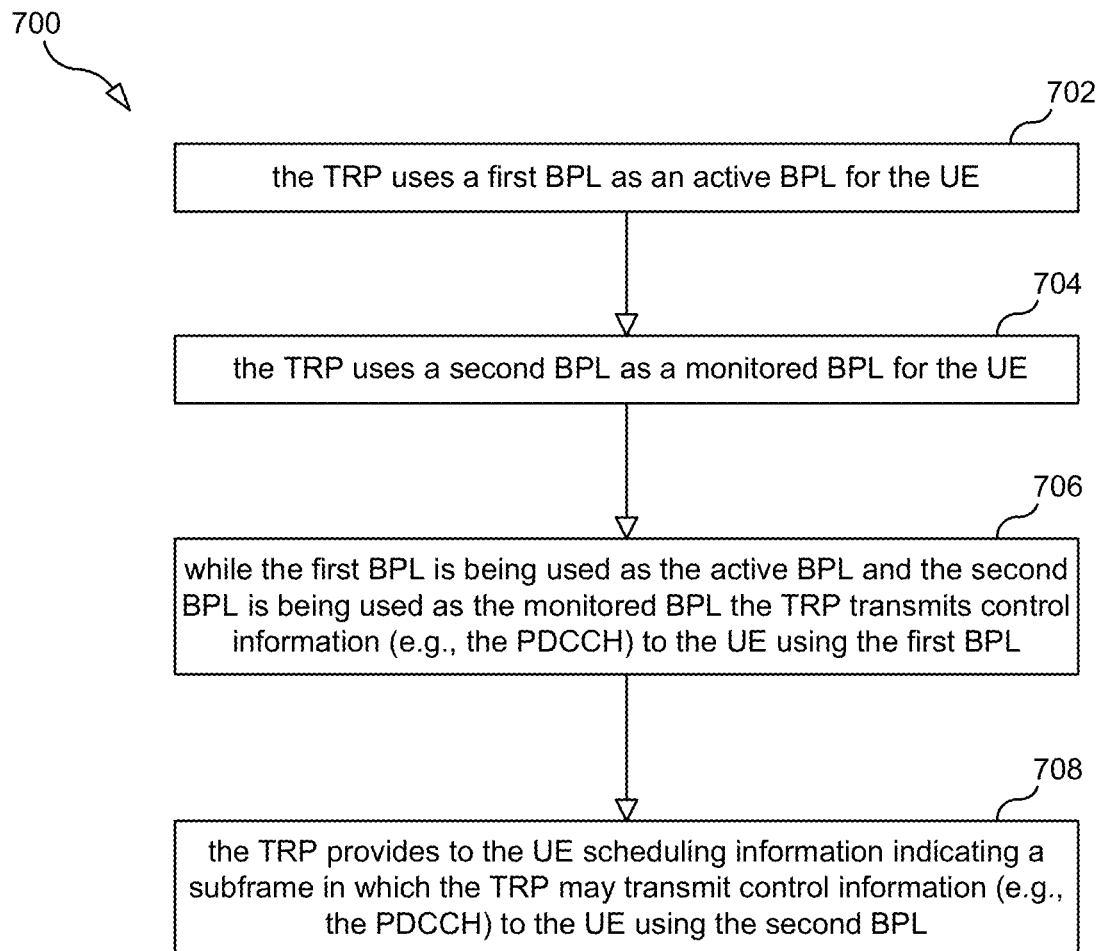
FIG. 7 is a flow chart illustrating a process according to one embodiment.

FIG. 7 is a flow chart illustrating a process 700, according to some embodiments, that is performed by the TRP (which may have a first coverage area).

Process 700 may begin with step 702 in which the TRP uses a first BPL as an active BPL for the UE, wherein the first BPL comprises a first TX beam and a first RX beam corresponding to the first TX beam (the first BPL may have a second coverage area within the first coverage area).

In step 704, the TRP uses a second BPL as a monitored BPL for the UE, wherein the second BPL comprises a second TX beam and a second RX beam corresponding to the second TX beam (the second BPL may have a third coverage area that is within the first coverage area and that is different than the second coverage area of the first BPL).

In step 706, while the first BPL is being used as the active BPL and the second BPL is being used as the monitored BPL the TRP transmits control information (e.g., the PDCCH) to the UE using the first BPL (i.e., using the first TX beam).

In step 708, the TRP provides to the UE scheduling information indicating a subframe in which the TRP may transmit control information (e.g., the PDCCH) to the UE using the second BPL (i.e., using the second TX beam).

In some embodiments, process 700 further includes the TRP detecting that the first BPL has experienced a beam pair link failure (BPLF); and, as a result of detecting that the first BPL has experienced a BPLF, the TRP transmitting control information to the UE in the indicated subframe using the second BPL.

In some embodiments, the control information transmitted to the UE in the indicated subframe using the second BPL informs the UE that the second BPL is now an active BPL for the UE. In some embodiments, the UE is configured such that the UE will search a control area of the indicated subframe for control information transmitted by the TRP using the second BPL.

In some embodiments, the step of transmitting control information to the UE using the first BPL while the first BPL is being used as the active BPL and the second BPL is being used as the monitored BPL comprises transmitting control information to the UE using the first BPL in not more than M of N consecutive subframes, wherein N is greater than 1 and M is less than or equal to N (in some embodiments M=N), and the indicated subframe is one of the N consecutive subframes.

In some embodiments, the scheduling information indicates L subframes (in some embodiments L=1) in which the TRP may transmit control information to the UE using the second BPL, wherein L is greater than or equal to 1 and L is less than M, and each of the L subframes is one of the N consecutive subframes. In some embodiments, M=N-1 and L=1. In some embodiments, in one of the N consecutive subframes the TRP transmits control information to the UE using the second BPL but does not transmit control information to the UE using the first BPL.

Figure 8:
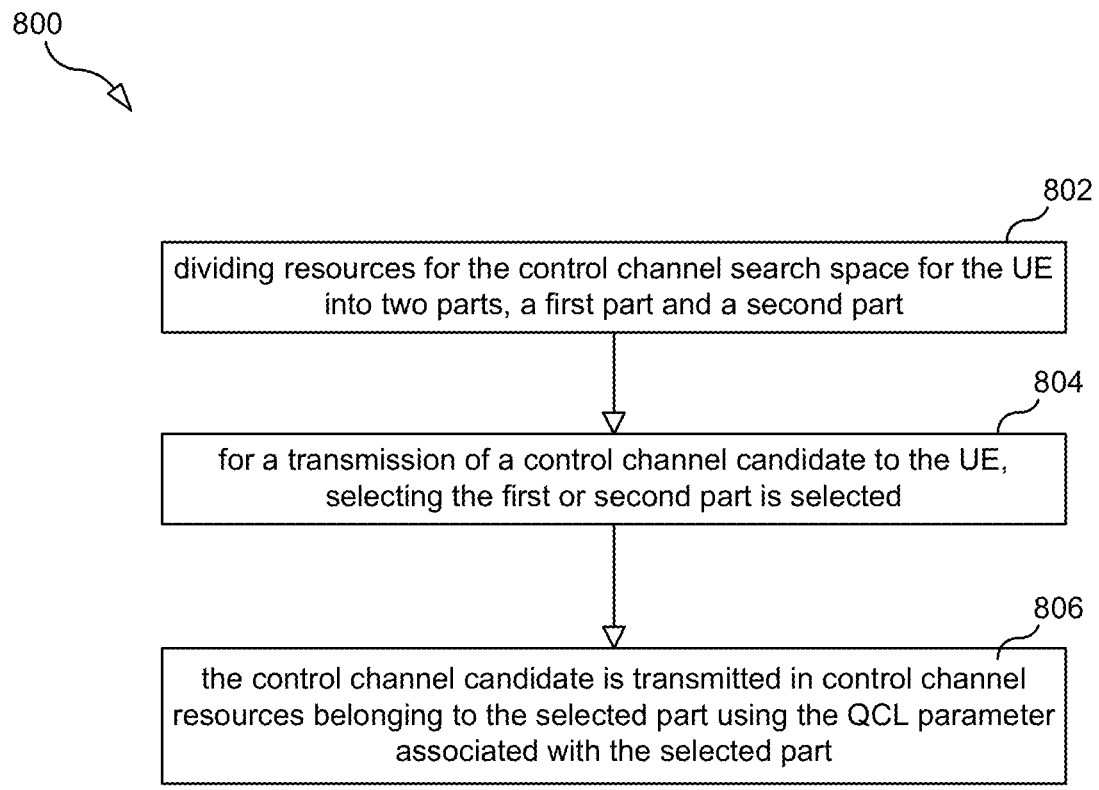
FIG. 8 is a flow chart illustrating a process according to one embodiment.

FIG. 8 is a flow chart illustrating a process 800, according to some embodiments, that is performed by one or more transmission points (TRPs) communicating with a user equipment (UE) wherein the UE is monitoring a control channel search space of control channel message candidates (e.g PDCCH).

Process 800 may being with step 802 which consists of dividing resources for the control channel search space for the UE into two parts, a first part and a second part, where the first part is associated with a first QCL parameter and a second part is associated with a second QCL parameter. In step 804, for a transmission of a control channel candidate to the UE, selecting the first or second part is selected. In step 806, the control channel candidate is transmitted in control channel resources belonging to the selected part using the QCL parameter associated with the selected part. In some embodiments, the first QCL parameter is related to an active BPL and the second QCL parameter is related to a monitored BPL, and the selection is based on information that the active BPL has experienced a BPLF (e.g., the active BPL has low or no reception quality).

Figure 9:
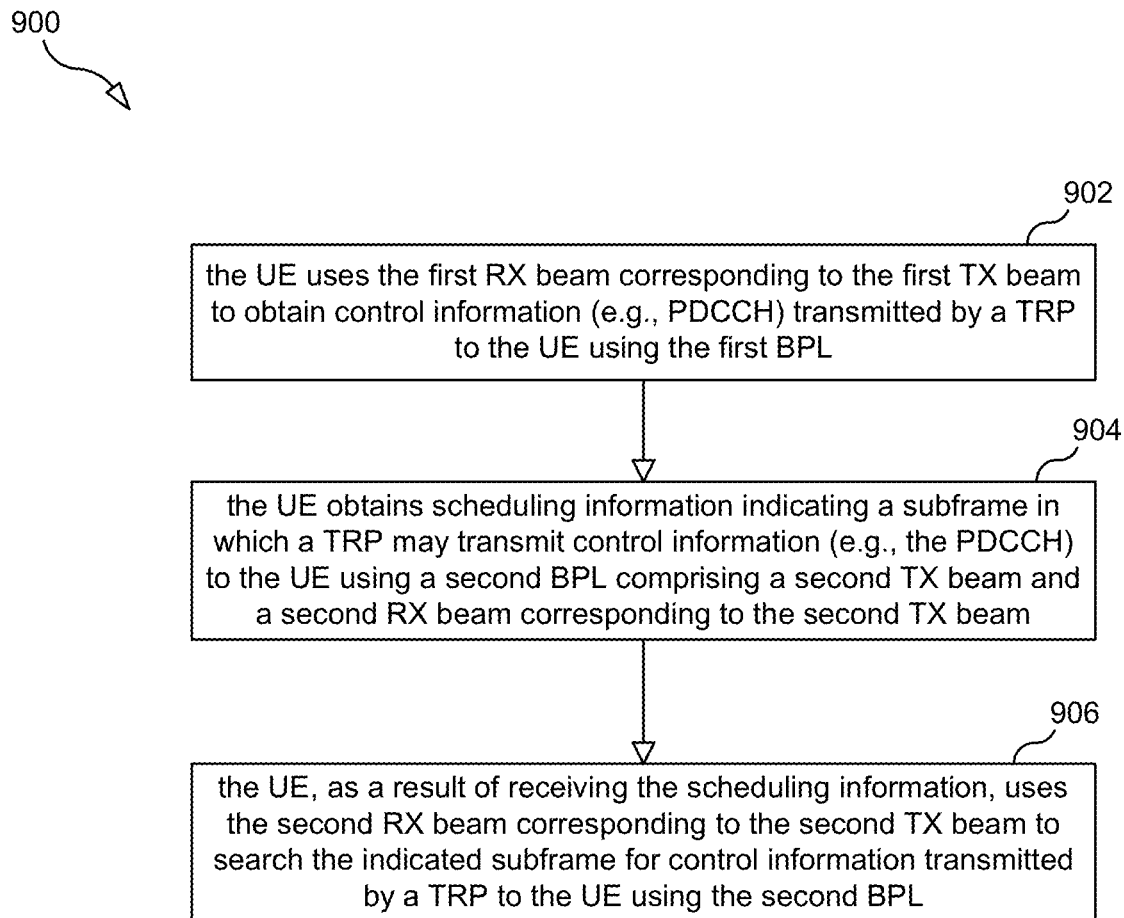
FIG. 9 is a flow chart illustrating a process according to one embodiment.

FIG. 9 is a flow chart illustrating a process 900, according to some embodiments, that is performed by a UE communicating with one or more transmission points (TRPs), wherein the TRPs are configured to transmit information to the UE using a first BPL comprising a first TX beam and a first RX beam corresponding to the first TX beam (the first BPL may have a second coverage area within the first coverage area).

Process 900 may begin in step 902 in which the UE uses the first RX beam corresponding to the first TX beam to obtain control information (e.g., PDCCH) transmitted by a TRP to the UE using the first BPL. In step 904, the UE obtains scheduling information indicating a subframe in which a TRP may transmit control information (e.g., the PDCCH) to the UE using a second BPL comprising a second TX beam and a second RX beam corresponding to the second TX beam (the second BPL may have a third coverage area that is within the first coverage area but that is different than the second coverage area of the first BPL). In step 906, the UE, as a result of receiving the scheduling information, uses the second RX beam corresponding to the second TX beam to search the indicated subframe for control information transmitted by a TRP to the UE using the second BPL. In some embodiments, a TRP transmits in the subframe the control information to the UE using the second BPL in the event that the TRP detects that the first BPL has experienced a beam pair link failure (BPLF). In some embodiments, as a result of the search, the UE obtains control information transmitted to the UE using the second BPL, and the obtained control information informs the UE that he second BPL is now an active BPL for the UE. In some embodiments, the indicated subframe is a subframe in which a TRP does not transmit control information to the UE using the first BPL.

Figure 10:
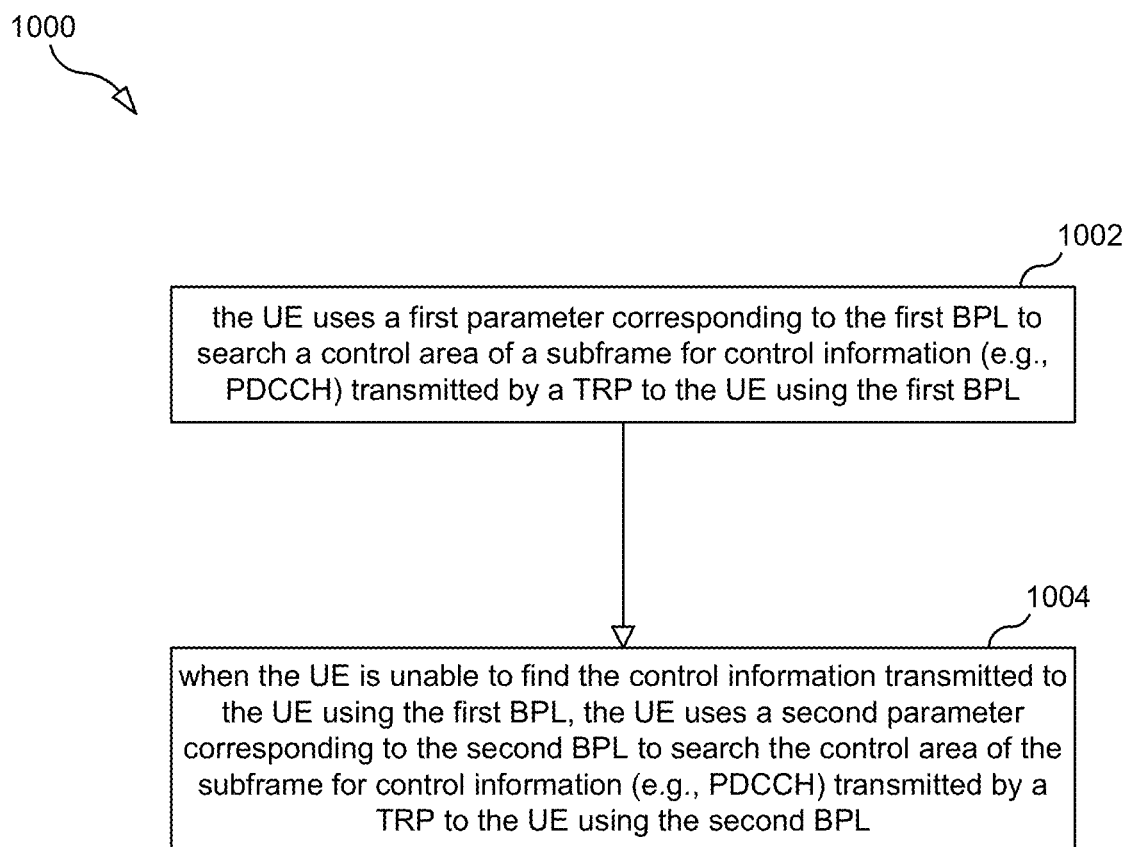
FIG. 10 is a flow chart illustrating a process according to one embodiment.

FIG. 10 is a flow chart illustrating a process 1000, according to some embodiments, that is performed by a UE communicating with one or more transmission points (TRPs), wherein the TRPs are configured to transmit information to the UE using the first BPL. Process 1000 may begin in step 1002 in which the UE uses a first parameter corresponding to the first BPL to search a control area of a subframe for control information (e.g., PDCCH) transmitted by a TRP to the UE using the first BPL. In step 1004, when the UE is unable to find the control information transmitted to the UE using the first BPL, the UE uses a second parameter corresponding to the second BPL to search the control area of the subframe for control information (e.g., PDCCH) transmitted by a TRP to the UE using the second BPL.

Figure 11:
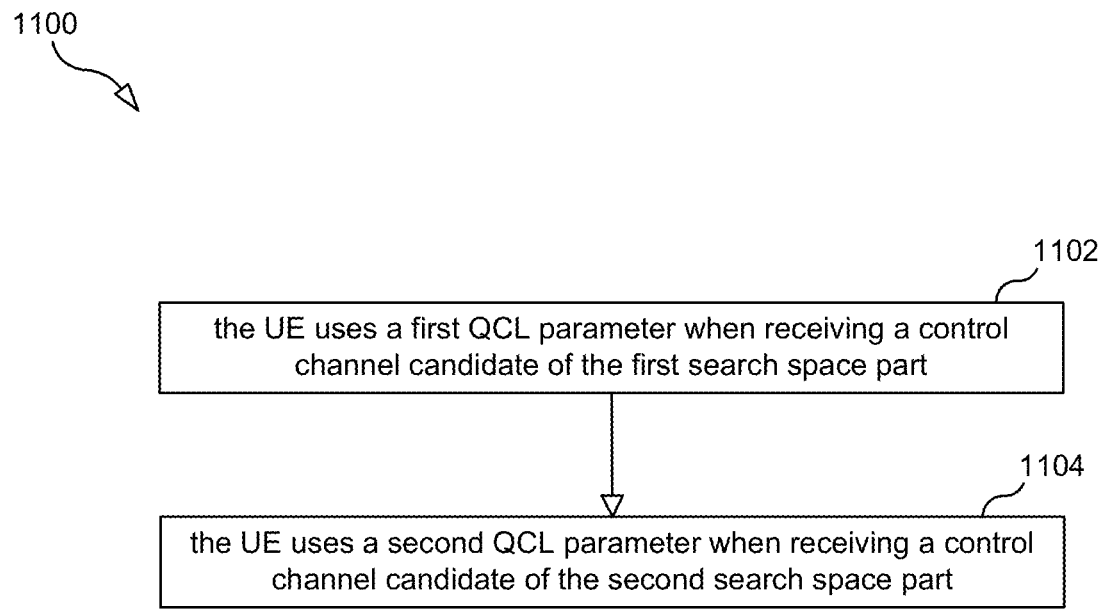
FIG. 11 is a flow chart illustrating a process according to one embodiment.

FIG. 11 is a flow chart illustrating a process 1100, according to some embodiments, that is performed by a UE communicating with one or more transmission points (TRPs), wherein the UE is monitoring a control channel search space of control channel message candidates (e.g PDCCH), wherein the control channel search space of control channel message candidates is divided into a least two parts, a first part and a second part. Process 1100 may being in step 1102 in which the UE uses a first QCL parameter when receiving a control channel candidate of the first search space part. In step 1104, the UE uses a second QCL parameter when receiving a control channel candidate of the second search space part. In some embodiments, the search space candidates of the two parts are received in two different OFDM symbols in one subframe. In some embodiments, the search space candidates of the two parts are received in two different subframes. In some embodiments, process 1100 further includes the UE receiving configuration information using a higher layer message (e.g., a layer 3 message, such as radio resource control (RRC) message), wherein the configuration information configures the division of the search space.

Figure 12:
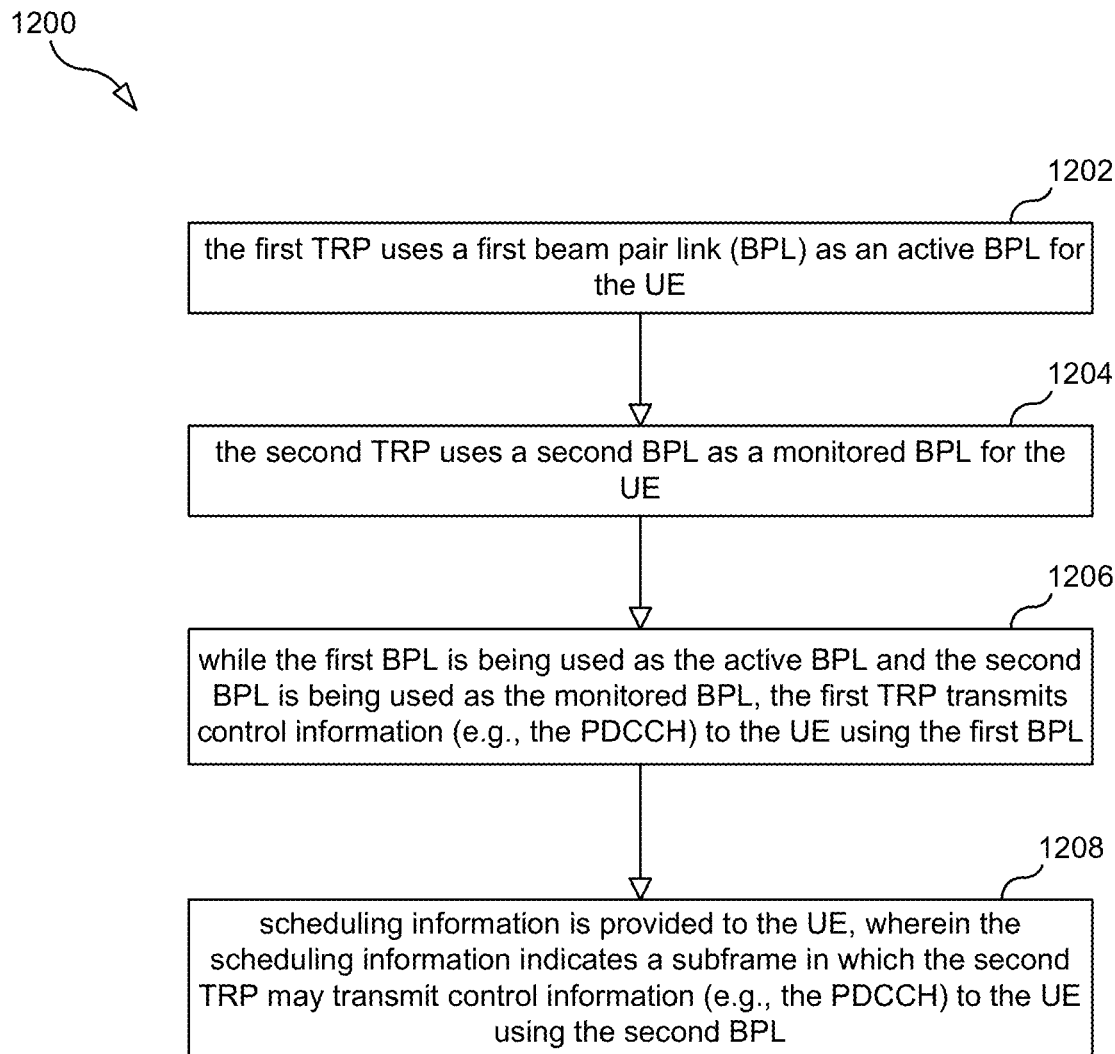

FIG. 12 is a flow chart illustrating a process 1200, according to some embodiments, that is performed by a system 1500 (see FIG. 15) comprising a first transmission point (TRP) (e.g., TRP 550 as shown) for communicating with UE 501 and a second TRP 1502 for communicating with the UE. Process 1200 may being in step 1202 in which the first TRP uses a first beam pair link (BPL) (denoted BPL #1) as an active BPL for the UE. In step 1204, the second TRP uses a second BPL (denoted BPL #2) as a monitored BPL for the UE. In step 1206, while the first BPL is being used as the active BPL and the second BPL is being used as the monitored BPL, the first TRP transmits control information (e.g., the PDCCH) to the UE using the first BPL (i.e., using the TRP TX beam of the first BPL). In step 1208, scheduling information is provided to the UE, wherein the scheduling information indicates a subframe in which the second TRP 1502 may transmit control information (e.g., the PDCCH) to the UE using the second BPL (i.e., using the TRP TX beam of the second BPL).

Figure 13:
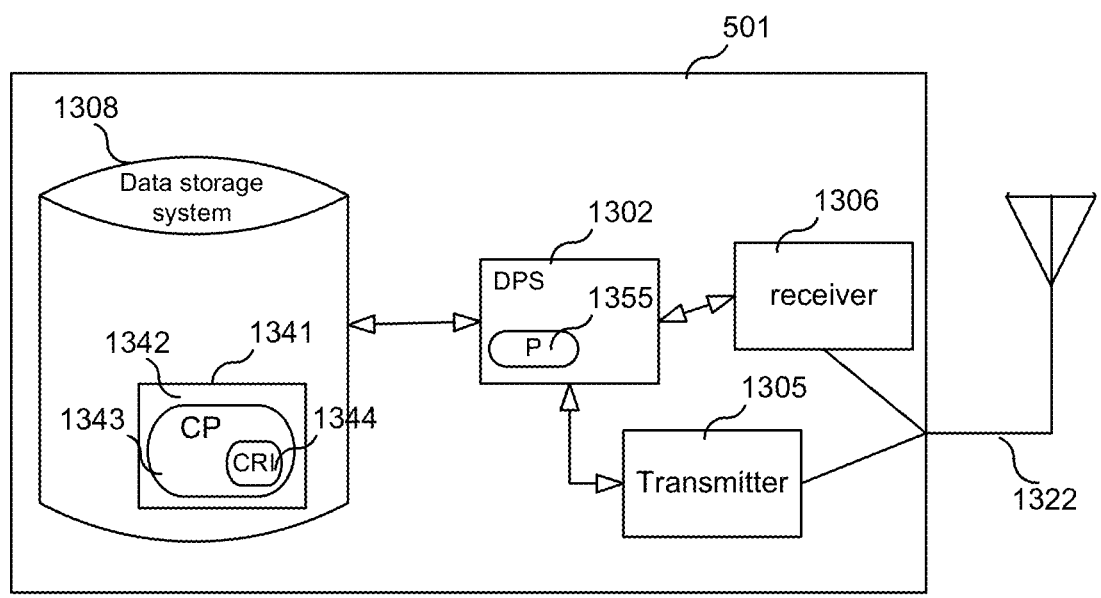
FIG. 13 is a block diagram of a UE according to some embodiments.

FIG. 13 is a block diagram of UE 501 according to some embodiments. As shown in FIG. 13, the UE may comprise: a data processing system (DPS) 1302, which may include one or more processors 1355 (e.g., a general purpose microprocessor and/or one or more other processors, such as an application specific integrated circuit (ASIC), field-programmable gate arrays (FPGAs), and the like); a radio transmitter 1305 and a radio receiver 1306 coupled to an antenna 1322 for use in wirelessly communicating with a radio access network (RAN) node (e.g., a TRP); and local storage unit (a.k.a., "data storage system") 1312, which may include one or more non-volatile storage devices and/or one or more volatile storage devices (e.g., random access memory (RAM)). In embodiments where the UE includes a general purpose microprocessor, a computer program product (CPP) 1341 may be provided. CPP 1341 includes a computer readable medium (CRM) 1342 storing a computer program (CP) 1343 comprising computer readable instructions (CRI) 1344. CRM 1342 may be a non-transitory computer readable medium, such as, but not limited to, magnetic media (e.g., a hard disk), optical media (e.g., a DVD), memory devices (e.g., random access memory, flash memory, etc.), and the like. In some embodiments, the CRI 1344 of computer program 1343 is configured such that when executed by data processing system 1302, the CRI causes the UE to perform steps described above (e.g., steps described above with reference to the flow charts). In other embodiments, the UE may be configured to perform steps described herein without the need for code. That is, for example, data processing system 1302 may consist merely of one or more ASICs. Hence, the features of the embodiments described herein may be implemented in hardware and/or software.

Figure 14:
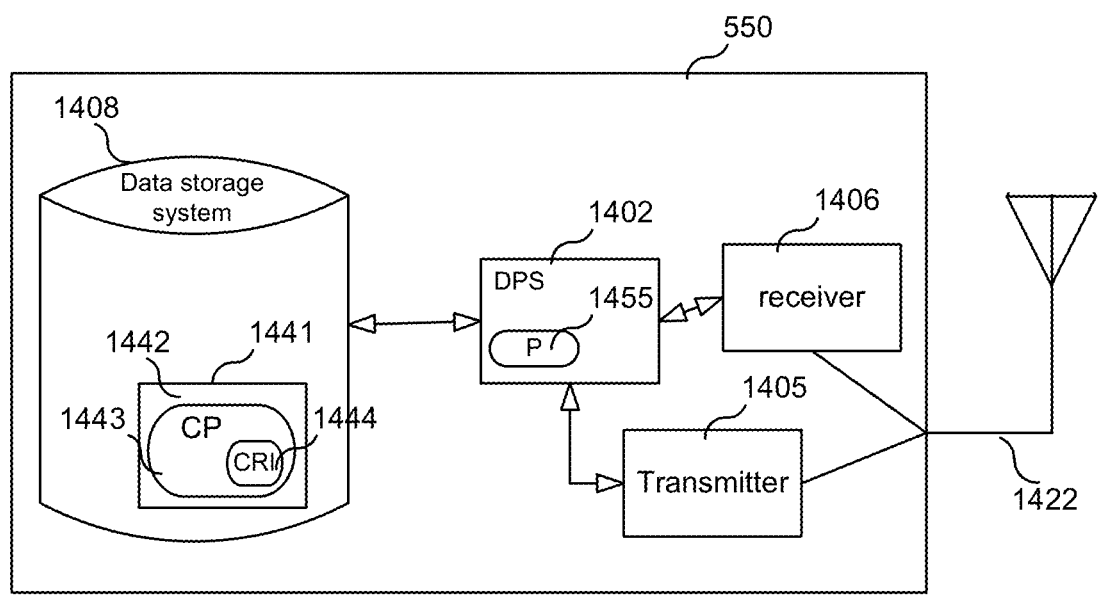
FIG. 14 is a block diagram of TRP according to some embodiments.

FIG. 14 is a block diagram of TRP 550 according to some embodiments. As shown in FIG. 14, the TRP may comprise: a data processing system (DPS) 1402, which may include one or more processors 1455 (e.g., a general purpose microprocessor and/or one or more other processors, such as an application specific integrated circuit (ASIC), field-programmable gate arrays (FPGAs), and the like); a radio transmitter 1405 and a radio receiver 1406 coupled to an antenna 1422 for use in wirelessly communicating with a UE; and local storage unit (a.k.a., "data storage system") 1412, which may include one or more non-volatile storage devices and/or one or more volatile storage devices (e.g., random access memory (RAM)). In embodiments where the TRP includes a general purpose microprocessor, a computer program product (CPP) 1441 may be provided. CPP 1441 includes a computer readable medium (CRM) 1442 storing a computer program (CP) 1443 comprising computer readable instructions (CRI) 1444. CRM 1442 may be a non-transitory computer readable medium, such as, but not limited to, magnetic media (e.g., a hard disk), optical media (e.g., a DVD), memory devices (e.g., random access memory, flash memory, etc.), and the like. In some embodiments, the CRI 1444 of computer program 1443 is configured such that when executed by data processing system 1402, the CRI causes the TRP to perform steps described above (e.g., steps described above with reference to the flow charts). In other embodiments, the TRP may be configured to perform steps described herein without the need for code. That is, for example, data processing system 1402 may consist merely of one or more ASICs. Hence, the features of the embodiments described herein may be implemented in hardware and/or software.

Additional Embodiments

TRP Embodiments

1. A method performed by a transmission point (TRP) for communicating with a user equipment (UE), comprising: using a first beam pair link (BPL) as an active BPL for the UE, wherein the first BPL comprises a first TX beam and a first RX beam corresponding to the first TX beam; using a second BPL as a monitored BPL for the UE, wherein the second BPL comprises a second TX beam and a second RX beam corresponding to the second TX beam; while the first BPL is being used as the active BPL and the second BPL is being used as the monitored BPL, transmitting control information (e.g., the PDCCH) to the UE using the first BPL; and providing to the UE scheduling information indicating a subframe in which the TRP may transmit control information (e.g., the PDCCH) to the UE using the second BPL.

2. The method of embodiment 1, further comprising: the TRP detecting that the first BPL has experienced a beam pair link failure (BPLF); and as a result of detecting that the first BPL has experienced a BPLF, the TRP transmitting control information to the UE in the indicated subframe using the second BPL.

3. The method of embodiment 2, wherein the control information transmitted to the UE in the indicated subframe using the second BPL informs the UE that the second BPL is now an active BPL for the UE.

4. The method of embodiment 3, wherein the UE is configured such that the UE will search a control area of the indicated subframe for control information transmitted by the TRP using the second BPL.

5. The method of any one of embodiments 1-4, wherein the step of transmitting control information to the UE using the first BPL while the first BPL is being used as the active BPL and the second BPL is being used as the monitored BPL comprises transmitting control information to the UE using the first BPL in not more than M of N consecutive subframes, wherein N is greater than 1 and M is less than or equal to N, and the indicated subframe is one of the N consecutive subframes.

6. The method of embodiment 5, wherein the scheduling information indicates L subframes in which the TRP may transmit control information to the UE using the second BPL, wherein L is greater than or equal to 1 and L is less than M, and each of the L subframes is one of the N consecutive subframes.

7. The method of embodiment 6, wherein M=N−1 and L=1.

8. The method of embodiment 7, wherein in one of the N consecutive subframes the TRP transmits control information to the UE using the second BPL but does not transmit control information to the UE using the first BPL.

9. The method of embodiment 6, wherein M=N and L=1.

10. A method performed by one or more transmission points (TRPs) communicating with a user equipment (UE) wherein the UE is monitoring a control channel search space of control channel message candidates (e.g PDCCH), the method comprising: dividing resources for the control channel search space for the UE into two parts, a first part and a second part, where the first part is associated with a first QCL parameter and a second part is associated with a second QCL parameter; for a transmission of a control channel candidate to the UE, selecting the first or second part; and transmitting the control channel candidate in control channel resources belonging to the selected part using the QCL parameter associated with the selected part.

11. The method of embodiment 10, where the first QCL parameter is related to an active BPL and the second QCL parameter is related to a monitored BPL.

12. The method of embodiment 11, where the selection is based on information that the active BPL has experienced a BPLF (e.g., the active BPL has low or no reception quality).

13. A TRP comprising a transmitter, a receiver, a memory, and a data processing system comprising one or more processors, wherein the TRP is configured to perform the method of any one of embodiments 1-12.

UE Side Embodiments

14. A method performed by a user equipment (UE) communicating with one or more transmission points (TRPs), wherein the TRPs are configured to transmit information to the UE using a first beam pair link (BPL) comprising a first transmit (TX) beam and a first receive (RX) beam corresponding to the first TX beam, the method comprising: the UE using the first RX beam corresponding to the first TX beam to obtain control information (e.g., PDCCH) transmitted to the UE using the first BPL; the UE obtaining scheduling information indicating a subframe in which one of the TRPs may transmit control information (e.g., the PDCCH) to the UE using a second BPL comprising a second TX beam and a second RX beam corresponding to the second TX beam; as a result of receiving the scheduling information, the UE using the second RX beam corresponding to the second TX beam to search the indicated subframe for control information transmitted to the UE using the second BPL.

15. The method of embodiment 14, wherein a TRP transmits in the subframe the control information to the UE using the second BPL in the event that the TRP detects that the first BPL has experienced a beam pair link failure (BPLF).

16. The method of embodiment 14 or 12, wherein, as a result of the search, the UE obtains control information transmitted to the UE using the second BPL, and the obtained control information informs the UE that he second BPL is now an active BPL for the UE.

17. The method of any one of embodiments 14-13, wherein the indicated subframe is a subframe in which a TRP does not transmit control information to the UE using the first BPL.

18. A method performed by a user equipment (UE) communicating with one or more transmission points (TRPs), wherein the TRPs are configured to transmit information to the UE using a first beam pair link (BPL) comprising a first transmit (TX) beam and a first receive (RX) beam corresponding to the first TX beam, the method comprising: the UE using a first parameter corresponding to the first BPL to search a control area of a subframe for control information (e.g., PDCCH) transmitted by a TRP to the UE using the first BPL; when the UE is unable to find the control information transmitted by the TRP to the UE using the first BPL, the UE using a second parameter corresponding to a second BPL to search the control area of the subframe for control information (e.g., PDCCH) transmitted by a TRP to the UE using the second BPL, wherein the second BPL comprises a second TX beam and a second RX beam corresponding to the second TX beam.

19. A method performed by a user equipment (UE) communicating with one or more transmission points (TRPs), wherein the UE is monitoring a control channel search space of control channel message candidates (e.g PDCCH), wherein the control channel search space of control channel message candidates is divided into a least two parts, a first part and a second part, the method comprising: the UE using a first QCL parameter when receiving a control channel candidate of the first search space part; and the UE using a second QCL parameter when receiving a control channel candidate of the second search space part.

20. The method of embodiment 19, wherein the search space candidates of the two parts are received in two different OFDM symbols in one subframe.

21. The method of embodiment 19, wherein the search space candidates of the two parts are received in two different subframes.

22. The method of any one of embodiments 19-21, further comprising the UE receiving configuration information using a higher layer message (e.g., a layer 3 message, such as radio resource control (RRC) message), wherein the configuration information configures the division of the search space.

System Embodiments

23. A method performed by a system comprising a first transmission point (TRP) for communicating with a user equipment (UE) and a second TRP for communicating with the UE, comprising: the first TRP using a first beam pair link (BPL) as an active BPL for the UE; the second TRP using a second BPL as a monitored BPL for the UE; while the first BPL is being used as the active BPL and the second BPL is being used as the monitored BPL, the first TRP transmitting control information (e.g., the PDCCH) to the UE using the first BPL; and providing to the UE scheduling information indicating a subframe in which the second TRP may transmit control information (e.g., the PDCCH) to the UE using the second BPL.

24. The method of embodiment 23, further comprising: detecting that the first BPL has experienced a beam pair link failure (BPLF); as a result of detecting that the first BPL has experienced a BPLF, the second TRP transmitting control information to the UE in the indicated subframe using the second BPL.

25. The method of embodiment 24, wherein the control information transmitted to the UE in the indicated subframe using the second BPL informs the UE that the second BPL is now an active BPL for the UE.

26. The method of embodiment 25, wherein the UE is configured such that the UE will search a control area of the indicated subframe for control information transmitted by the second TRP using the second BPL.

27. The method of any one of embodiments 23-26, wherein the step of transmitting control information to the UE using the first BPL while the first BPL is being used as the active BPL and the second BPL is being used as the monitored BPL comprises transmitting control information to the UE using the first BPL in not more than M of N consecutive subframes, wherein N is greater than 1 and M is less than or equal to N, and the indicated subframe is one of the N consecutive subframes.

28. The method of embodiment 27, wherein the scheduling information indicates L subframes in which the second TRP may transmit control information to the UE using the second BPL, wherein L is greater than or equal to 1 and L is less than M, and each of the L subframes is one of the N consecutive subframes.

29. The method of embodiment 28, wherein M=N−1 and L=1.

30. The method of embodiment 29, wherein in one of the N consecutive subframes the second TRP transmits control information to the UE using the second BPL but the first TRP does not transmit control information to the UE using the first BPL.

31. The method of embodiment 28, wherein M=N and L=1.

32. A UE comprising a transmitter, a receiver, a memory, and a data processing system comprising one or more processors, wherein the TRP is configured to perform the method of any one of embodiments 14-22.

While various embodiments of the present disclosure are described herein (including the appendix), it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by one or more transmission points (TRPs) communicating with a user equipment (UE), the method comprising:
    defining a first search space and a second search space, wherein a first transmit (TX) beam is associated with the first search space and a second TX beam is associated with the second search space;
    for a transmission of a control channel candidate to the UE, selecting the first or second search space; and
    transmitting the control channel candidate in control channel resources belonging to the selected search space using the TX beam associated with the selected search space, wherein
    the first search space is a first portion of a control area of a first subframe that has a data area that is separate from the control area of the first subframe, and
    the second search space is a second portion of the control area of said first subframe or the second search space is a portion of a control area of a second subframe.

2. The method of claim 1, where the first TX beam is related to a first BPL and the second TX beam is related to a second BPL.

3. The method of claim 2, where the selection is based on information that the first BPL has experienced a beam pair link failure.

4. The method of claim 2, wherein
    the second search space is a second portion of the control area of said first subframe.

5. The method of claim 4, wherein
    the first portion of the control area and the second portion of the control area overlap in time at least partially, or
    the first portion of the control area does not overlap in time with the second portion of the control area.

6. The method of claim 2, wherein
    the first search space is the control area of the first subframe, and
    the second search space is the control area of the second subframe.

7. A transmission point (TRP), the TRP comprising:
    a transmitter,
    a receiver,
    a memory, and
    a data processing system comprising one or more processors, wherein the TRP is configured to perform the method of claim 1.

8. A method performed by a user equipment (UE) communicating with one or more transmission points (TRPs), the method comprising:
    the UE using a first set of one or more quasi co-location (QCL) parameters for receiving a control channel candidate in a first search space; and
    the UE using a second set of one or more QCL parameters for receiving a control channel candidate in a second search space, wherein,
    the first search space is a first portion of a control area of a first subframe that has a data area that is separate from the control area of the first subframe, and
    the second search space is a second portion of the control area of said first subframe or the second search space is a portion of a control area of a second subframe.

9. The method of claim 8, wherein
    the second search space is a second portion of the control area of said first subframe.

10. The method of claim 9, wherein
    the first portion of the control area and the second portion of the control area overlap in time at least partially, or
    the first portion of the control area does not overlap in time with the second portion of the control area.

11. The method of claim 8, wherein
    the first search space is the control area of the first subframe, and
    the second search space is the control area of the second subframe.

12. The method of claim 8, wherein at least one of the QCL parameters in each of the first and second sets of QCL parameters is a spatial QCL parameter.

* * * * *